United States Patent Office 3,445,450
Patented May 20, 1969

3,445,450
METAL-CONTAINING DISAZO-DYESTUFFS
Fritz Meininger and Anni Signon, Frankfurt am Main, and Klaus Berner, Hofheim, Taunus, Germany, assignors to Farbwerke Hoechst Aktiengesellschaft vormals Meister Lucius & Bruning, Frankfurt am Main, Germany, a corporation of Germany
No Drawing. Filed Dec. 6, 1965, Ser. No. 511,993
Claims priority, application Germany, Dec. 12, 1964, F 44,683
Int. Cl. C09b 62/78, 62/84, 45/24
U.S. Cl. 260—148                                    6 Claims

ABSTRACT OF THE DISCLOSURE

Fiber-reactive copper, cobalt and chromium complex compounds of disazo-dyestuffs containing

—SO$_2$—CH$_2$—CH$_2$—O—SO$_3$H or

—SO$_2$—CH=CH$_2$ radicals as the reactive group, which dyestuffs are especially suitable for dyeing or printing cellulose materials and yield on such materials dyeings of intense reddish-blue to black shades having very good fastness to wet processing.

---

The present invention relates to new metal-containing disazo-dyestuffs and to a process for preparing them; more particularly, the present invention relates to complex cooper, cobalt or chromium compounds of disazo-dyestuffs which, in the form of the free acids, correspond to the general formula

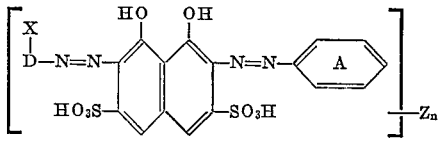
(1)

wherein D represents the radical of a diazo-component of the benzene or naphthalene series, X represents a hydroxyl or carboxyl group bound in o-position to the azo bridge, Z represents a group of the formula

—SO$_2$—CH$_2$—CH$_2$—O—SO$_3$H (3)

or

—SO$_2$—CH=CH$_2$ (3)

and $n$ represents the integer 1 or 2, and wherein the benzene nucleus A may carry substituents.

We have found that valuable complex copper, cobalt or chromium compounds of disazo-dyestuffs which in the form of free acids correspond to the formula

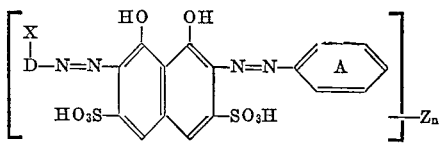
(1)

wherein D represents the radical of a diazo-component of the benzene or naphthalene series, X represents a hydroxyl or carboxyl group bound in o-position to the azo bridge, Z represents a group of the formula

—SO$_2$—CH$_2$—CH$_2$—O—SO$_3$H (2)

or

—SO$_2$CH=CH$_2$ (3)

and $n$ represents the integer 1 or 2, and wherein the benzene nucleus A may carry substituents, are obtained by coupling complex copper, cobalt or chromium compounds of monoazo-dyestuffs, which in the form of the free acids correspond to the general formula

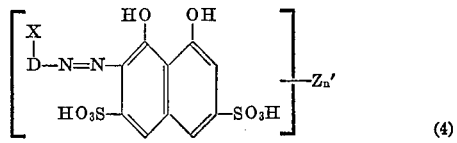
(4)

wherein D, X and Z have the meanings given above and $n'$ represents 0, 1 or 2, with diazotized amines of the benzene series in a weakly alkaline, neutral or weakly acid medium, the components being selected in a manner such that the metal-containing disazo-dyestuffs obtained contain one or two groups of the Formula Z.

The grouping D and the benzene nucleus A in the above Formula 1 may carry any substituents in addition to the groups of the above Formulae 2 and 3. As examples, there may be mentioned halogen atoms such as chlorine or bromine atoms, nitro, cyano, acetylamino, unsubstituted and substituted alkyl groups, such as methyl, ethyl or trifluoromethyl groups. Furthermore alkoxy groups such as methoxy or ethoxy groups, alkylsulfone groups such as methyl- or ethylsulfone groups, and water-solubilizing groups such as sulfonic acid, sulfonic acid amide, sulfonic acid monoalkylamide, sulfonic acid dialkylamide or carboxylic acid groups.

The diazotization of the aminobenzenes used is carried out in the usual manner at 0 to 5° C. Coupling of the diazo compounds obtained with the metallised monoazo-dyestuffs of the indicated Formula 4 is suitably effected at 10 to 40° C. in a weakly acid, neutral or weakly alkaline medium, at a pH-value from 4 to 9 and preferably at a pH-value in the range of from 5 to 7. The complex metal disazo-dyestuffs formed are precipitated from the reaction mixture by means of sodium chloride or potassium chloride, filtered off, washed and dried. If necessary, the products of the invention may be isolated by spray-drying from the formed dyestuff solution directly following the coupling reaction.

As diazotizable amines which may be used for preparing the metallised disazo-dyestuffs of the present invention, there may be mentioned preferably those containing electronegative groups. As examples, there may be mentioned: 1-aminobenzene-4-sulfonic acid, 1-aminobenzene-2,4- or 2,5-disulfonic acid, 4-nitro-1-aminobenzene, 4-methylsulfonyl-1-aminobenzene, 1 - aminobenzene - 4-sulfonic acid amide, 4-nitro-2-methoxy-1-aminobenzene, 4-vinylsulfonyl-1-aminobenzene, furthermore the sulfuric acid esters of 1-aminobenzene-4-β-hydroxyethylsulfone, 2-aminoanisol-4-β-hydroxyethylsulfone, 1-amino-2,5-dimethoxybenzene-4-β-hydroxyethylsulfone and 1-amino-2-methoxy-5-methyl-4-β-hydroxyethylsulfone.

The metallised starting dyestuffs of the above-indicated Formula 4 may be obtained in known manner by coupling 1,8-dihydroxy-naphthalene-3,6-disulfonic acid with aromatic amines of the benzene or naphthalene series which contain, in o-position to the diazo group, a substituent capable of forming a complex metal or a substituent convertible into a group forming a metal complex. The monoazo-dyestuffs thus obtained are then transformed into the corresponding complex metal compounds, whereby 1:1 or 2:1 complex metal dyestuffs are obtained.

It was surprising that the process of the invention for preparing metal-containing disazo-dyestuffs of the above Formula 1 could be realised with such a good result, since it was known that the metal-free monoazo-dyestuffs of the indicated Formula 4 can be coupled with diazotized aromatic amines in a strongly alkaline medium only. But coupling in a strong alkaline medium is impossible in view of the sensitivity of the groups of the Formulae 2 and 3, which would be inactivated thereby.

In the metal-containing disazo-dyestuffs obtained according to the present invention, the molar proportion of disazo-dyestuff to metal is 1:1 in the case of copper complexes and 1:1 or 2:1 in the case of the metals cobalt or chromium.

The metal-containing disazo-dyestuffs of the present invention are excellently suitable for the dyeing and printing of cellulose materials of natural or regenerated cellulose. For this purpose, they are applied to the said textiles according to the dyeing or printing methods usually employed for reactive dyestuffs and then fixed at ordinary or elevated temperature by a treatment with an acid-binding agent; this treatment may be carried out either before, during or after application of the dyestuff.

The disazo dyestuffs of the present invention yield on cellulose materials intense reddish blue to black shades which possess good to very good fastness to wet processing, especially to washing. Moreover, the cotton dyeings possess a good to very good fastness to light, rubbing and dry cleaning.

The following examples illustrate the invention, but they are not intended to limit it thereto.

Example 1

(a) 31.1 parts by weight of 2-amino anisole-4-β-hydroxyethylsulfone-sulfuric acid ester were dissolved in 250 parts by volume of water by the addition of 5.3 parts by weight of sodium carbonate. The solution was combined with 100 parts by weight of semi-concentrated hydrochloric acid and diazotization was carried out at 0° C. with 20 parts by volume of of a 5 N sodium nitrite solution. 51.2 parts by weight of 1,8-dihydroxynaphthalene-3,6-disulfonic acid (62.5%) were then added to the diazo suspension obtained and the pH-value of the reaction solution was adjusted to 4.5–5 by adding crystalline sodium acetate. Coupling was complete after a few hours. The red dyestuff formed was salted out by the addition of 40 parts by weight of sodium chloride, filtered off and washed.

(b) To effect the demethylating coppering, the wet filter cake was dissolved in 400 parts by volume of water at 60° C. and, after addition of 25 parts by weight of crystalline copper sulfate, the solution was stirred for 12 hours at a temperature in the range of from 85 to 90° C. The pH was maintained at 5 by adding sodium acetate. Then, 80 parts by weight of sodium chloride were added, the precipitated violet complex copper dyestuff was filtered with suction and washed with 500 parts by weight of a 15% sodium chloride solution.

(c) 31.1 parts by weight of 2 - amino - anisole-4-β-hydroxyethylsulfone-sulfuric acid ester were diazotized as described under (a). The diazo suspension thus obtained was neutralized with crystalline sodium acetate and combined with a solution of the complex copper monoazo-dyestuff obtained according to (b) in 300 parts by volume of water. The pH-value of the mixture was maintained at about 6 during coupling by careful addition of sodium hydrogen carbonate. After 8–10 hours, coupling was complete. The dyestuff was salted out by the addition of 25% of sodium chloride (referred to the volume of the solution), filtered off, washed with a 15% sodium chloride solution and dried at 50–60° C. under reduced pressure. A blue black powder was obtained which dissolved in water while giving a blue solution. The dyestuff, which corresponded to the formula

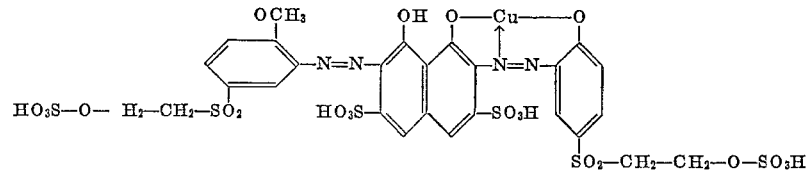

gave on cellulose fibers in the presence of sodium bicarbonate or of sodium hydroxide navy blue prints or dyeings which had very good fastness to light and to wet treatment.

Example 2

(a) 29.7 parts by weight of 2-aminophenol-4-β-hydroxyethylsulfone-sulfuric acid ester were dissolved in 500 parts by volume of water by the addition of 5.3 parts by weight of sodium carbonate and diazotized as described in Example 1, paragraph (a). After neutralization of the diazo-solution with sodium acetate, a solution of 51.2 parts by weight of 1,8 - dihydroxynaphthalene - 3,6 - disulfonic acid (62.5%) in 500 parts by volume of water was added. The pH-value of the coupling solution was maintained at 5–5.5. A part of the red monoazo-dyestuff formed precipitated during coupling, which was complete after about 24 hours. Precipitation was completed by the addition of 100 parts by volume of sodium chloride. After having separated the dyestuff by filtration, it was washed with a dilute sodium chloride solution.

(b) For preparing the complex copper monoazo-dyestuff, the wet filter cake was dissolved in 1000 parts by volume of water and combined at room temperature with 25 parts by weight of crystalline copper sulfate. The solution was buffered with crystalline sodium acetate. After 5 hours, the formation of the complex was complete. 250 parts by weight of sodium chloride were added to the solution, the precipitated dyestuff was filtered off and washed several times with a 15% sodium chloride solution.

(c) 25.3 parts by weight of 1-aminobenzene-2,4-disulfonic acid were dissolved in 250 parts by volume of water with sodium carbonate until the solution showed a neutral reaction and, after addition of 100 parts by weight of semi-concentrated hydrochloric acid, it was diazotized at 0° C. with 20 parts by volume of 5 N sodium nitrite solution. The temperature of the diazo suspension was allowed to rise to about 20° C. the excess acid was neutralized with sodium acetate, and then the diazo-component thus prepared was combined with a solution of the complex copper monoazo-dyestuff obtained according to b in 1200 parts by volume of water. During coupling, the pH was maintained at 6–7 by careful addition of sodium carbonate. The dyestuff solution was then stirred over night and the dyestuff was salted out by the addition of 180 parts by weight of potassium chloride and 180 parts by weight of sodium chloride, filtered off and dried. The salt-containing dyestuff thus obtained which corresponded to the formula

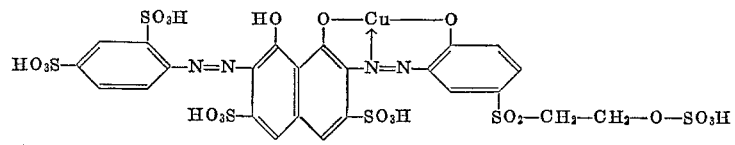

dyed cellulose fibers in the presence of disodium phosphate and sodium hydroxide dark-blue shades which were fast to washing and to light.

Example 3

The monoazo-dyestuff obtained according to Example 2, paragraph (a), was dissolved in 700 parts by volume of water. This solution was combined with 60 parts by weight of chrome alum and adjusted to a pH-value of 5 by the addition of sodium acetate. The mixture was heated, while stirring, for 3 hours at 80° C. The blue solution of the 2:1 complex chromium dyestuff formed was then combined with a diazonium salt solution, which had been prepared by diazotizing 13.8 parts by weight of 4-nitro-1-aminobenzene in 250 parts by volume of water and 100 parts by weight of semi-concentrated hydrochloric acid with 20 parts by volume of 5 N sodium nitrite solution and neutralization with crystalline sodium acetate. During coupling, a pH-value of 5 was maintained. The disazo-dyestuff, which corresponded to the formula

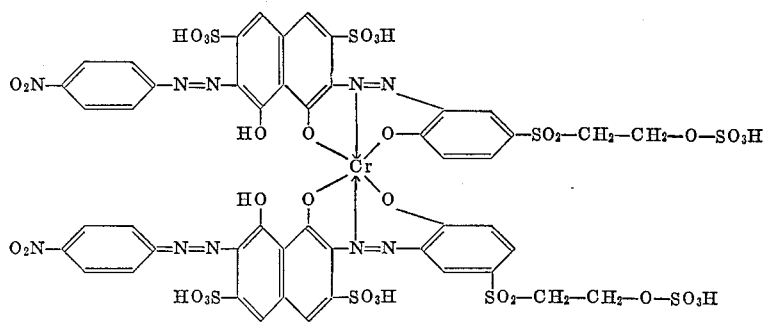

was salted out with 250 parts by weight of sodium chloride filtered off, washed and dried.

The dyestuff gave on cellulose fibers in the presence of sodium hydroxide greenish grey to black dyeings which were fast to light and to washing.

Examples 4–28

The following table lists additional metal-containing disazo-dyestuffs which may be obtained in a manner similar to that described in Examples 1 to 3. The dyestuffs are defined in the Table by the diazo-component of the monoazo-dyestuff (column I), by the diazo-component of the disazo-dyestuff (column III), by the complex-bound metal atom (column II) and by the shades of the dyeings and prints on cotton (column IV).

We claim:
1. A complex copper, cobalt or chromium disazo-dyestuff compound having in the free acid form the formula

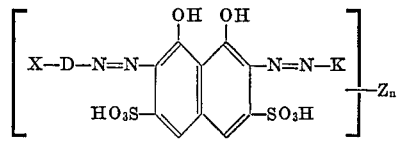

wherein D is a benzene, chlorobenzene, dichlorobenzene, lower alkylbenzene, lower alkoxybenzene, mono-sulfobenzene, mono-sulfonaphthalene or di-sulfonaphthalene group, X is a hydroxyl or carboxyl group at an ortho-position to the azo bridge, K is a benzene, nitrobenzene, lower alkoxybenzene, mono-sulfobenzene or di-sulfobenzene group, Z is a group

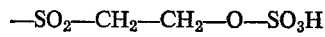

or

linked to either said D or K group at a position other than ortho- to the azo bridge, and $n$ is the integer 1 or 2, the molar proportion of said diazo dyestuff to copper being 1:1, to cobalt being 1:1 or 2:1 and to chromium being 1:1 or 2:1, provided that in complex dyestuffs of said 2:1 ratio the two equivalents of said diazo dyestuff are the same.

| Example | 1st Diazo component (I) | Complex bound metal (II) | 2nd Diazo component (III) | Shade (IV) |
| --- | --- | --- | --- | --- |
| 4 | 2-aminophenol-4-β-hydroxyethylesulfone-sulfuric acid ester. | Cu | 1-aminobenzene-sulfonic acid | Navy blue. |
| 5 | do | Co | 1-aminobenzene-4-β-hydroxy-ethylsulfone sulfuric acid ester. | Grey to black. |
| 6 | do | Co | 1-aminobenzene-4-sulfonic acid | Do. |
| 7 | do | Co | 1-aminobenzene-2, 4-disulfonic acid | Do. |
| 8 | do | Co | 4-nitro-1-aminobenzene | Do. |
| 9 | do | Cr | 1-aminobenzene-4-β-hydroxy-ethylsulfone-sulfuric acid ester. | Do. |
| 10 | do | Cr | 2-aminoanisole-4-β-hydroxy-ethylsulfone-sulfuric acid ester. | Do. |
| 11 | 2-aminophenol-5-sulfonic acid | Cr | do | Navy blue. |
| 12 | do | Cr | 2-aminophenol-4-β-hydroxyethylsulfone-sulfonic acid ester. | Do. |
| 13 | 2-aminophenol-4-sulfonic acid | Cu | 1-aminobenzene-4-β-hydroxy-ethylsulfone-sulfonic acid ester. | Do. |
| 14 | do | Cu | 2-aminoanisole-4-β-hydroxy-ethylsulfone-sulfuric acid ester. | Do. |
| 15 | 2-amino-1-naphthol-5-sulfonic acid | Cr | 1-aminobenzene-4-hydroxy-sulfone-sulfuric acid ester | Black. |
| 16 | do | Cr | 2-aminoanisole-4-β-hydroxyethyl-sulfone-sulfuric acid ester. | Navy blue. |
| 17 | 2-aminobenzene-1-carboxylic acid | Cr | 1-aminobenzene-4-β-hydroxyethyl-sulfone-sulfuric acid ester. | Do. |
| 18 | 2-amino-4-chlorophenol | Cu | do | Do. |
| 19 | do | Cr | do | Grey to black. |
| 20 | 2-amino-1-naphthol-4, 8-disulfonic acid | Cu | do | Navy blue. |
| 21 | 2-amino-4, 6-dichlorophenol | Cr | do | Grey blue. |
| 22 | 1-amino-2-methoxy-5-methyl-benzene-4-β-hydroxy-ethylsulfone-sulfuric acid ester. | Cu | do | Navy blue. |
| 23 | do | Cu | 2-aminoanisole-4-β-hydroxyethyl-sulfone-sulfuric acid ester. | Do. |
| 24 | do | Cu | 1-amino-2, 5-dimethoxybenzene-4-β-hydroxyethyl-sulfone-sulfuric acid ester. | Do. |
| 25 | 1-amino-2, 5-dimethoxybenzene-4-β-hydroxyethyl-sulfone-sulfuric acid ester. | Cu | do | Black. |
| 26 | 2-aminophenol-4-β-hydroxy-ethylsulfone-sulfuric acid ester. | Cr | do | Do. |
| 27 | do | Cr | 1-amino-2-methoxy-5-methylbenzene-4-β-hydroxy-ethylsulfone-sulfuric acid ester. | Do. |
| 28 | 2-amino-1-hydroxy-4-vinyl-sulfonyl-benzene | Cu | 2-aminoanisole-4-β-hydroxyethyl-sulfone-sulfuric acid ester. | Navy blue. |

2. The dyestuff of the formula
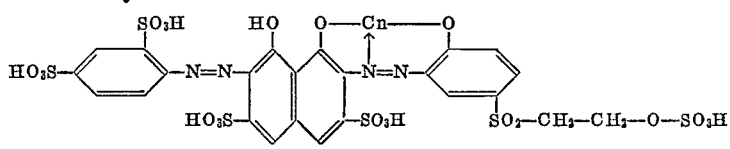
3. The dyestuff of the formula
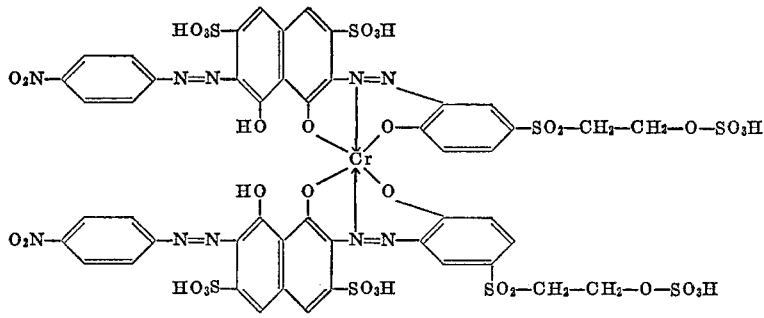
4. The dyestuff of the formula
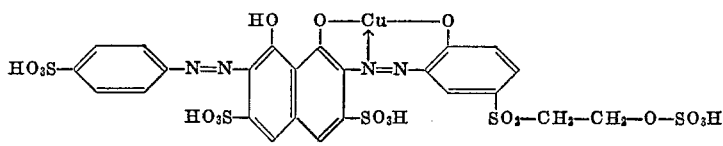
5. The dyestuff of the formula
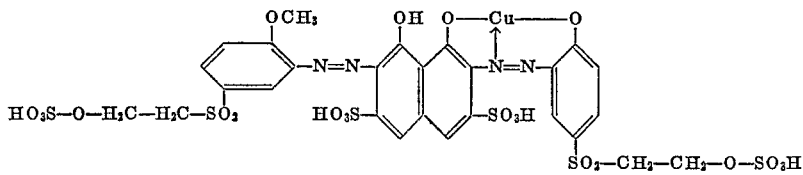
6. The dyestuff of the formula
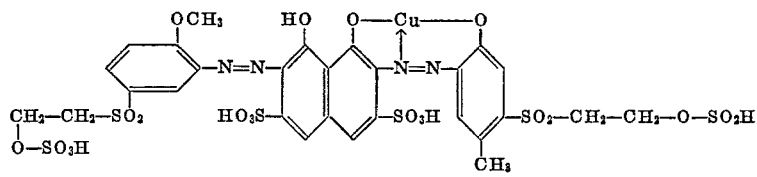
References Cited
UNITED STATES PATENTS
2,128,256  8/1938  Krzikalla et al. _____ 260—199
FOREIGN PATENTS
875,888  8/1961  Great Britain.
875,946  8/1961  Great Britain.
1,330,636  5/1963  France.
CHARLES B. PARKER, *Primary Examiner.*
DONALD M. PAPUGA, *Assistant Examiner.*
U.S. Cl. X.R.
8—42, 51; 260—150, 151, 191, 457